(12) United States Patent
Gedamu et al.

(10) Patent No.: US 6,624,686 B1
(45) Date of Patent: Sep. 23, 2003

(54) METHOD AND APPARATUS FOR SAVING POWER IN DYNAMIC CIRCUITS

(75) Inventors: Elias Gedamu, Fort Collins, CO (US); Denise Man, Fort Collins, CO (US); David John Marshall, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/205,831

(22) Filed: Jul. 26, 2002

(51) Int. Cl.$^7$ .............................. G05F 1/10; G05F 3/02
(52) U.S. Cl. ..................... 327/544; 326/93; 326/95; 326/98
(58) Field of Search ..................... 327/544; 326/93–98

(56) References Cited

U.S. PATENT DOCUMENTS 5,825,208 A * 10/1998 Levy et al. ................ 326/98
5,872,467 A * 2/1999 Huang ........................ 327/63

* cited by examiner

Primary Examiner—Terry D. Cunningham
Assistant Examiner—Quan Tra
(74) Attorney, Agent, or Firm—John Pessetto

(57) ABSTRACT

An embodiment of the invention provides a circuit and method for reducing power in dynamic circuits. A large single pre-charge FET is used to pre-charge the pre-charge nodes of all dynamic logic blocks contained in a plurality of dynamic logic blocks. The large single pre-charge FET replaces all smaller individual FETs that normally would be used. Because smaller FETs typically have more subthreshhold leakage than larger FETs, the overall subthreshhold leakage is reduced. The large pre-charge FET only replaces smaller pre-charge FETs that have the same pre-charge signal going to their gates.

9 Claims, 4 Drawing Sheets

METHOD AND APPARATUS FOR SAVING POWER IN DYNAMIC CIRCUITS

FIELD OF THE INVENTION

This invention relates generally to integrated circuit design. More particularly, this invention relates to reducing power in dynamic circuits.

BACKGROUND OF THE INVENTION

As more electronic circuits are included on a single die, the power dissipated by a single die continues to increase. In order to keep the temperature of a single IC (integrated circuit) at a reasonable temperature, many techniques have been used. For example, elaborate cooling fins have been attached to the substrate of ICs. Also, fans have been positioned near a group of IC's to cool them. In some cases, liquids have been used to transfer the heat produced by ICs. These solutions can be costly and may require a great deal of space, where space is at a premium.

In addition, the cost to air condition rooms where many computers are stored can be costly. Another problem created by ICs consuming more and more power is that in some cases not enough power can be supplied to a computer system through a single-phase power source. In order to supply enough current for this type of computer system, more costly three-phase power is required. If the power used by ICs can be reduced while still achieving higher levels of integration, the cost and area of devices that use ICs may be reduced.

Dynamic logic is a common type of logic used when designing ICs. Typically, a node in a dynamic logic block is precharged to voltage close to the value of a supply, VDD, during the precharge phase of a clock. On the next phase, the evaluation phase, of the clock, a combination of logic (e.g. NAND, NOR, etc) in the dynamic logic block will either discharge the precharged node or leave the node charged. In this manner, a dynamic logic block performs logic functions.

When a node is not discharged during the evaluation phase of the clock, the node ideally would retain all its charge. However, the node leaks off charge. The charge lost on the node is replaced by charge through a FET (Field Effect Transistor), usually a PFET (P-type Field Effect Transistor), that is connected between a power supply VDD and the node. Even though this FET is "off", subthreshhold leakage through the FET supplies charge to the node.

On an IC where many FETs are used to precharge dynamic logic blocks, subthreshhold leakage through these FETs can use a great deal of power. There is a need in the art to reduce the power consumed through subthreshold leakage in dynamic circuits.

One embodiment of this invention reduces the threshold leakage in dynamic logic blocks by replacing individual smaller FETs used to precharge individual dynamic logic blocks with a larger single FET. The larger FET replaces only FETs that have the same signal controlling their gates. A detailed description of one embodiment of this invention is described later.

SUMMARY OF THE INVENTION

An embodiment of the invention provides a circuit and method for reducing power in dynamic circuits. A large single pre-charge FET is used to precharge the pre-charge nodes of all dynamic logic blocks contained in a plurality of dynamic logic blocks. The large single pre-charge FET replaces all smaller individual FETs that normally would be used. Because smaller FETs typically have more subthreshhold leakage than larger FETs, the overall subthreshhold leakage is reduced. The large pre-charge FET only replaces smaller pre-charge FETs that have the same pre-charge signal going to their gates.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENT

Figure 1:
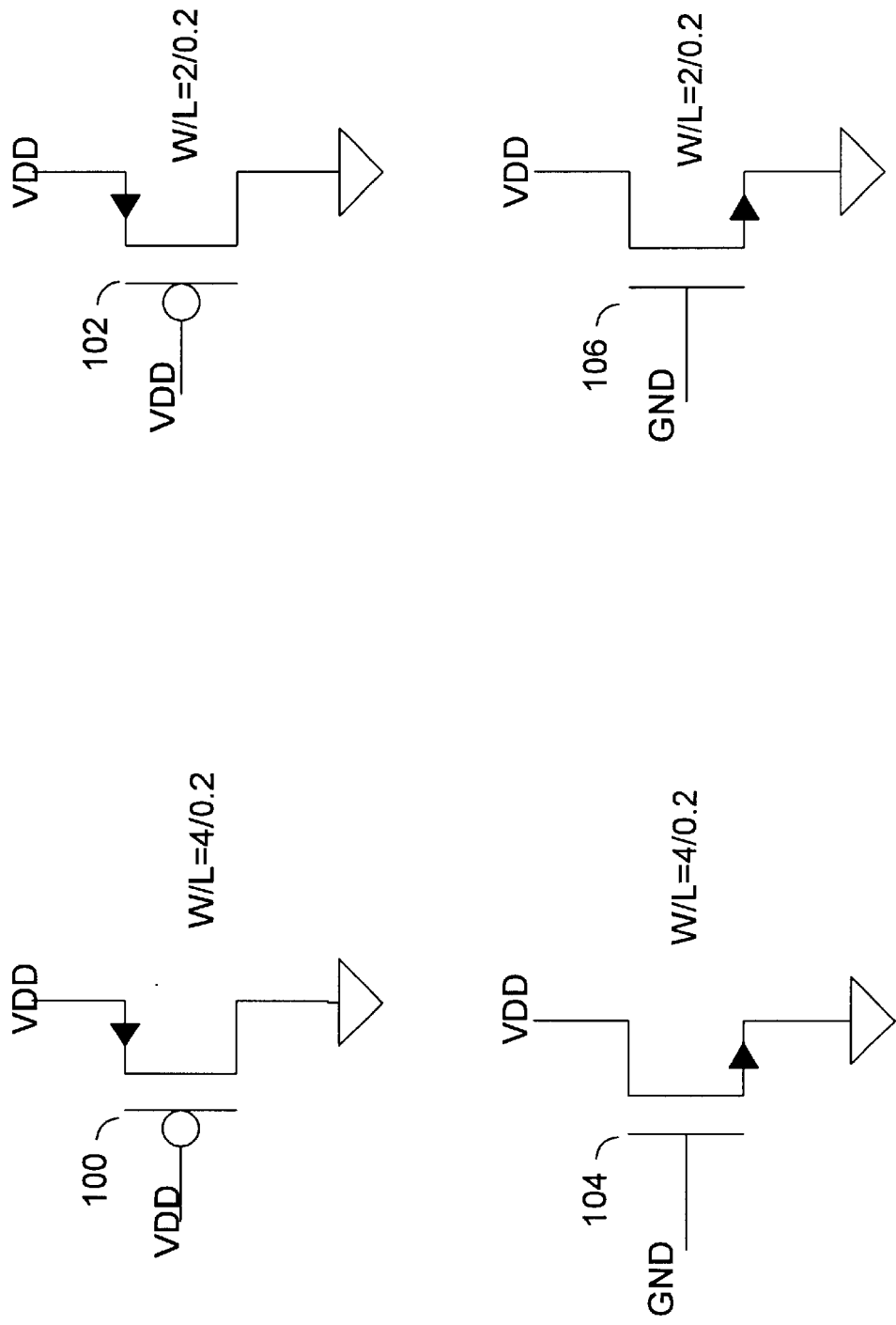
FIG. 1 contains four schematics of FETs configured in the "off" mode. Prior Art

FIG. 1 contains four FETs (Field Effect Transistors) biased in the "off" mode. Even though they are biased in the off mode, some leakage may occur between VDD and GND. One type of leakage that may occur when FETs are off is subthreshhold leakage. The leakage in an individual FET may be small, however when millions of FETs are used in a design, subthreshhold can be significant.

As ICs (Integrated Circuits) grow in complexity, the effective length, L, of an individual FET continues to decrease. A shorter effective L may also create greater subthreshhold leakage when compared to a FET with a longer effective L and the same W (width).

In addition, a wider W may have lower subthreshold leakage when compared with a FET with a shorter W and the same L. In FIG. 1, a PFET (P-type Field Effect Transistor), 100, is biased off because the gate is tied to VDD, the source is tied to VDD, and the drain is tied to GND. The W/L (Width/Length) of this PFET, 100, is 4/0.2. In FIG. 1, a PFET (P-type Field Effect Transistor), 102, is biased off because the gate is tied to VDD, the source is tied to VDD, and the drain is tied to GND. The W/L (Width/Length) of this PFET, 102, is 2/0.2. Because the PFET, 102, has a narrower W than the PFET, 100, PFET, 102 will, most likely, have greater subthreshhold leakage.

In FIG. 1, a NFET (N-type Field Effect Transistor), 104, is biased off because the gate is tied to GND, the source is tied to GND, and the drain is tied to VDD. The W/L (Width/Length) of this NFET, 104, is 4/0.2. In FIG. 1, a NFET (N-type Field Effect Transistor), 106, is biased off because the gate is tied to GND, the source is tied to GND, and the drain is tied to VDD. The W/L (Width/Length) of this NFET, 106, is 2/0.2. Because the NFET, 106, has a narrower W than the NFET, 104, NFET, 106 will, most likely, have greater subthreshhold leakage.

Figure 2:
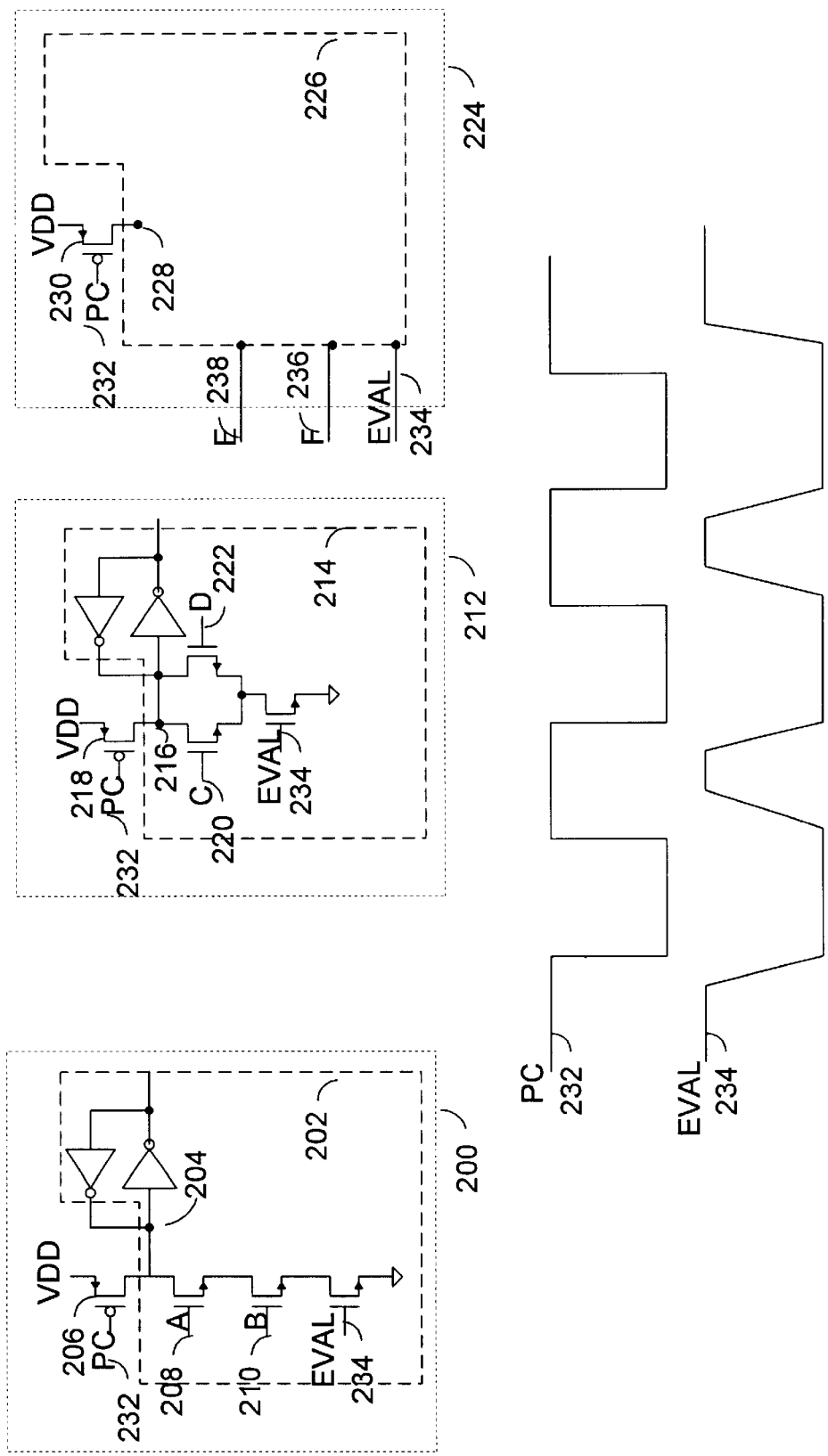
FIG. 2 contains schematics of an OR gate, an AND gate, a more generalized logic block, and timing waveforms. Prior Art FIG. 3 contains a schematic of a chain of logic blocks and waveforms that drive the logic blocks. Prior Art FIG. 4 contains a schematic of a chain of logic blocks and waveforms that drive the logic blocks.

FIG. 2 contains examples of dynamic logic circuits and voltage waveforms used to drive them. Logic block, 200, is a two-input AND gate. The pre-charge node, 204 is pre-charged high, through PFET, 206, when the voltage waveform, PC, 232, goes low. After the pre-charge node, 204, is pre-charged high, the voltage waveform PC, 232, goes high, and the voltage waveform, EVAL, 234, goes high. If logic signals A, 208, and B, 210 are both high, the pre-charge node, 204 will be discharged to a low value. However, if either of logic signals A, 208, or B, 210, is low, the pre-charge node, 204 will remain high. The box, 202, contains the logic and latch of a logic block. Box, 202, does not contain the pre-charge PFET, 206.

FIG. 2 contains examples of dynamic logic circuits and voltage waveforms used to drive them. Logic block, 212, is a two-input OR gate. The pre-charge node, 216 is pre-charged high, through PFET, 218, when the voltage waveform, PC, 232, goes low. After the pre-charge node, 216, is pre-charged high, the voltage waveform PC, 232, goes high, and the voltage waveform, EVAL, 234, goes high. If logic signal C, 220, or B, 222 is high, the pre-charge node, 216 will be discharged to a low value. However, if both logic signals C, 220, or D, 222, are low, the pre-charge node, 216 will remain high. The box, 214, contains the logic and latch of a logic block. Box, 214, does not contain the pre-charge PFET, 218.

Logic block, 224, represents a general logic block. This block, 224, is used later to help explain an embodiment of the invention. The pre-charge node, 228 is pre-charged high, through PFET, 230, when the voltage waveform, PC, 232, goes low. After the pre-charge node, 228, is pre-charged high, the voltage waveform PC, 232, goes high, and the voltage waveform, EVAL, 234, goes high. Logic signals E, 238, and F, 236, determine whether pre-charge node, 228, is discharged or not. The box, 226, contains the logic and latch of a logic block. Box, 226, does not contain the pre-charge PFET, 230.

Figure 3:
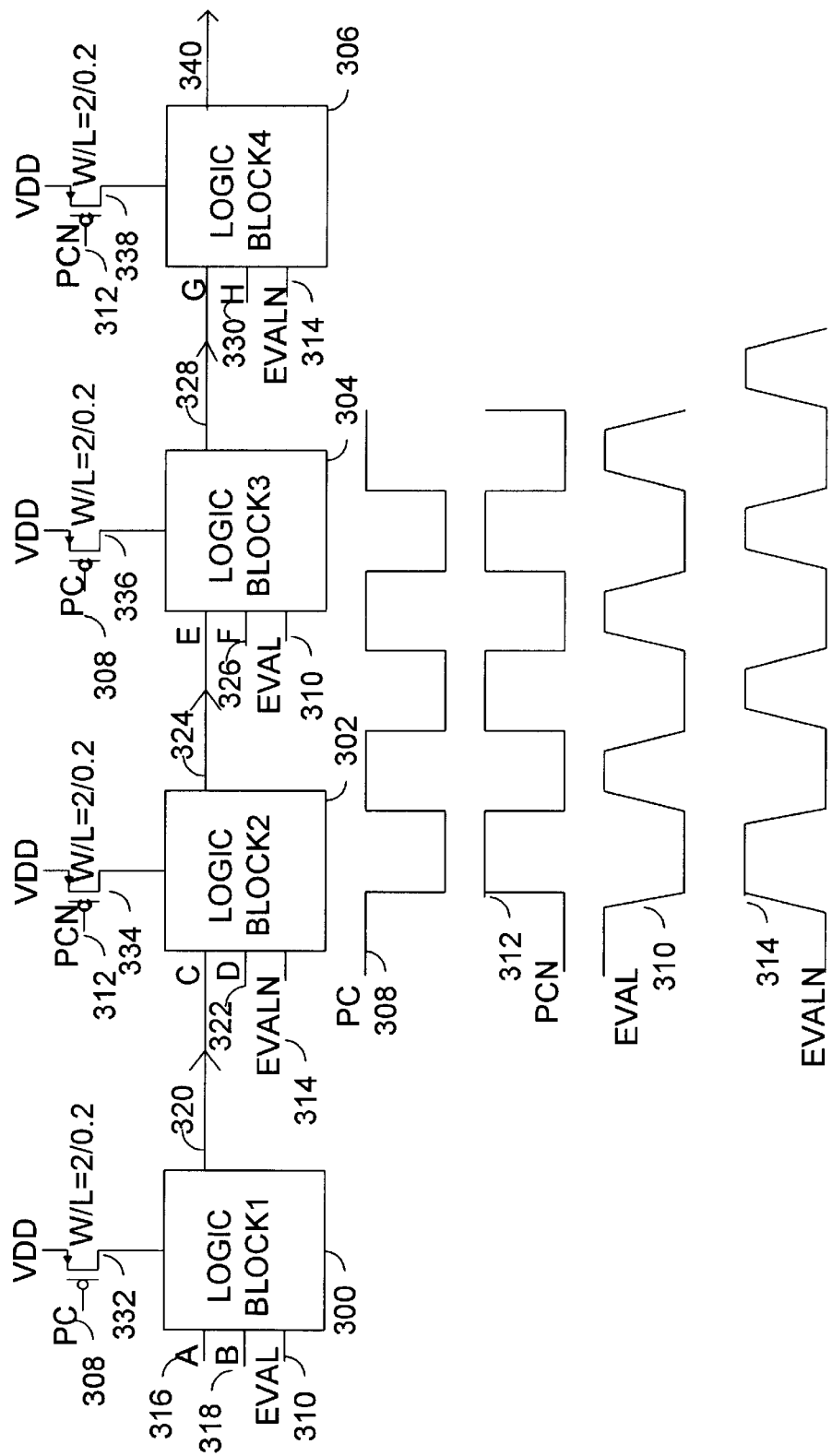

FIG. 3 contains a dynamic logic block chain and the signals that drive them. Logic Block 1, 300, is pre-charged through PFET, 332, when voltage waveform, PC, 308, goes low. PFET, 332, W/L ratio is 2/0.2. Signals A, 316, and B, 318 are used to determine whether a pre-charge node stays high or goes low when the voltage waveform, EVAL, 310, goes high. The output, 320, of Logic Block 1, 300, drives input C of Logic Block 2. Logic Block 2, 302, is pre-charged through PFET, 334, when voltage waveform, PCN, 312, goes low. PFET, 334, W/L ratio is 2/0.2. Signals C, 320, and D, 322 are used to determine whether a pre-charge node stays high or goes low when the voltage waveform, EVALN, 314, goes high. The output, 324, of Logic Block 2, 302, drives input E of Logic Block 3. Logic Block 3, 304, is pre-charged through PFET, 336, when voltage waveform, PC, 308, goes low. PFET, 336, W/L ratio is 2/0.2. Signals E, 324, and F, 326 are used to determine whether a pre-charge node stays high or goes low when the voltage waveform, EVAL, 310, goes high. The output, 328, of Logic Block 3, 304, drives input G of Logic Block 4. Logic Block 4, 306, is pre-charged through PFET, 338, when voltage waveform, PCN, 312, goes low. PFET, 338, W/L ratio is 2/0.2. Signals G, 328, and H, 330 are used to determine whether a pre-charge node stays high or goes low when the voltage waveform, EVALN, 314, goes high. The output, 340, of Logic Block 4, 306, does not drive another dynamic logic block in this example.

Figure 4:
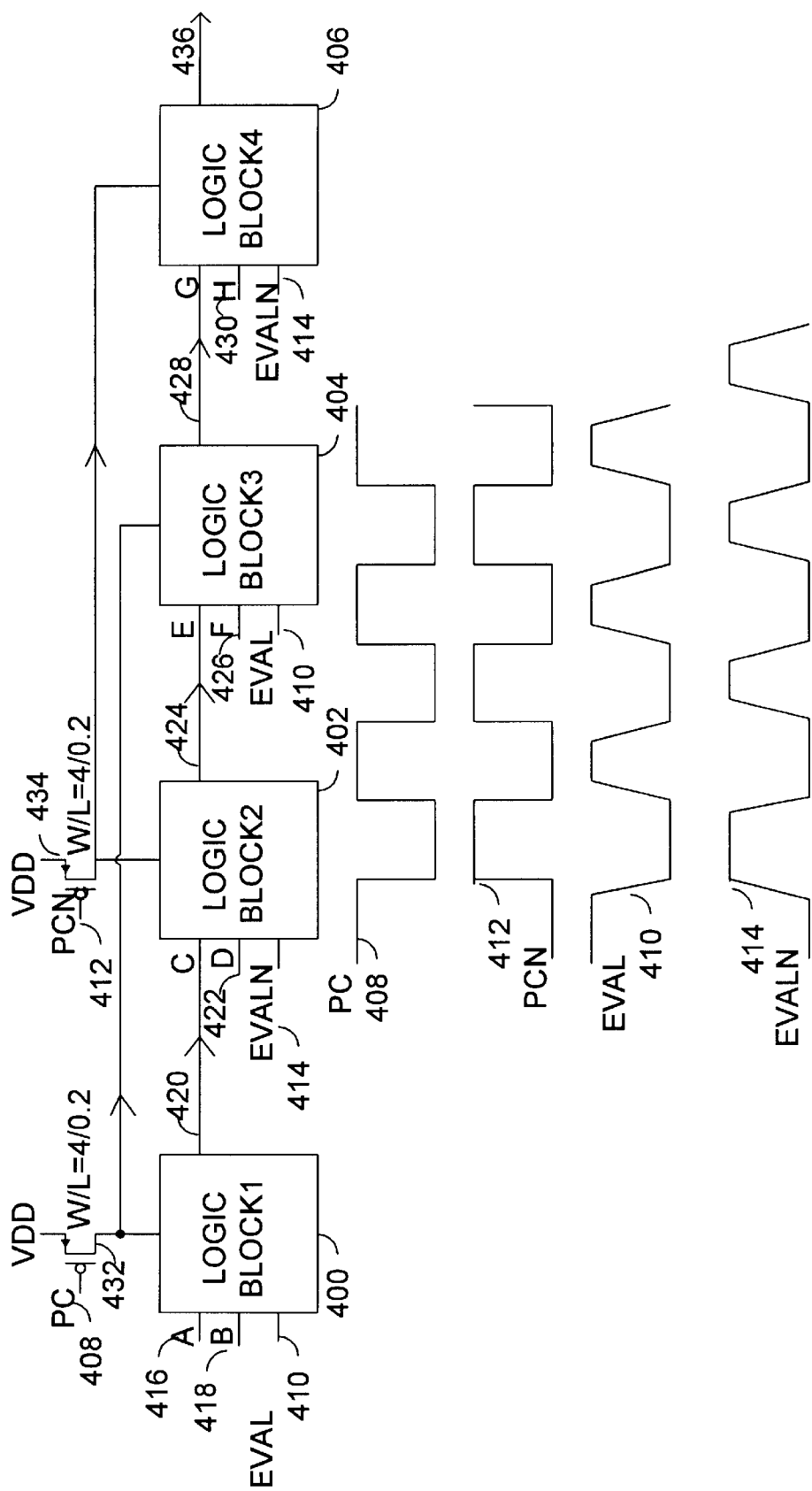

FIG. 4 illustrates how four smaller pre-charge PFETs may be replaced with two larger pre-charge PFETs, 432 and 434. As a result of replacing four smaller pre-charge PFETS with two larger pre-charge PFETS, 432 and 434, the subtreshhold leakage may be reduced. Reducing the subtreshhold leakage reduces the power consumed by the logic shown in this example.

FIG. 4 contains a dynamic logic block chain and the signals that drive them. Logic Block 1, 400, is pre-charged through PFET, 432, when voltage waveform, PC, 408, goes low. PFET, 432, W/L ratio is 4/0.2. Signals A, 416, and B, 418 are used to determine whether a pre-charge node stays high or goes low when the voltage waveform, EVAL, 410, goes high. The output, 420, of Logic Block 1, 400, drives input C of Logic Block 2. Logic Block 2, 402, is pre-charged through PFET, 434, when voltage waveform, PCN, 412, goes low. PFET, 434, W/L ratio is 4/0.2. Signals C, 420, and D, 422 are used to determine whether a pre-charge node stays high or goes low when the voltage waveform, EVALN, 414, goes high. The output, 424, of Logic Block 2, 402, drives input E of Logic Block 3. Logic Block 3, 404, is pre-charged through PFET, 432, when voltage waveform, PC, 408, goes low. PFET, 432, W/L ratio is 4/0.2. Signals E, 424, and F, 426 are used to determine whether a pre-charge node stays high or goes low when the voltage waveform, EVAL, 410, goes high. The output, 428, of Logic Block 3, 404, drives input G of Logic Block 4. Logic Block 4, 406, is pre-charged through PFET, 434, when voltage waveform, PCN, 412, goes low. PFET, 434, W/L ratio is 2/0.2. Signals G, 428, and H, 430 are used to determine whether a pre-charge node stays high or goes low when the voltage waveform, EVALN, 414, goes high. The output, 436, of Logic Block 4, 406, does not drive another dynamic logic block in this example.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A circuit for reducing power in dynamic logic blocks comprising:
    (a) a single pre-charge FET;
    (b) a plurality of dynamic logic blocks;
    (c) a pre-charge clock signal;
    (d) an evaluate clock signal;
    (e) a voltage reference, VDD;
    (f) wherein said pre-charge FET is connected between said voltage reference VDD, and a pre-charge node contained in each of said dynamic logic blocks contained in said plurality of dynamic logic blocks;
    (g) wherein said pre-charge clock signal is connected to a gate of said pre-charge FET;
    (h) wherein said evaluate clock signal is connected to each dynamic logic block contained in said plurality of dynamic logic blocks;
    (i) such that said evaluate clock signal controls when said plurality of dynamic logic blocks are evaluated.

2. The circuit as in claim 1 wherein said single pre-charge FET is a PFET.

3. The circuit as in claim 1 wherein said single pre-charge FET is a NFET.

4. The circuit as in claim 1 wherein said plurality of dynamic logic blocks contains at least one dynamic NOR block.

5. The circuit as in claim 1 wherein said plurality of dynamic logic blocks contains at least one dynamic NAND block.

6. The circuit as in claim 1 wherein said plurality of dynamic logic blocks contains at least one dynamic OR block.

7. The circuit as in claim 1 wherein said plurality of dynamic logic blocks contains at least one dynamic AND block.

8. The circuit as in claim 1 wherein said plurality of dynamic logic blocks contains at least one dynamic NOR block, at least one dynamic NAND block, at least one dynamic OR block, and at least one dynamic AND block.

9. A method for reducing power in dynamic logic blocks comprising:
   a) fabricating a single pre-charge FET;
   b) fabricating a plurality of dynamic logic blocks;
   c) generating a pre-charge clock signal;
   d) generating an evaluate clock signal;
   e) fabricating a voltage reference, VDD;
   f) wherein said pre-charge FET is connected between said voltage reference VDD, and a pre-charge node contained in each of said dynamic logic blocks contained in said plurality of dynamic logic blocks;
   g) wherein said pre-charge clock signal is connected to a gate of said pre-charge FET;
   h) wherein said evaluate clock signal is connected to each dynamic logic block contained in said plurality of dynamic logic blocks;
   i) such that said evaluate clock signal controls when said plurality of dynamic logic blocks are evaluated.

* * * * *